(12) United States Patent
Girardin et al.

(10) Patent No.: US 11,969,383 B2
(45) Date of Patent: *Apr. 30, 2024

(54) REAR EXCURSION BACKREST FOR WHEELCHAIR ACCESSIBLE VEHICLES

(71) Applicant: Valeda Company, LLC, Oakland Park, FL (US)

(72) Inventors: Patrick Girardin, Ft. Lauderdale, FL (US); Paul Edward Slevinsky, Brockville (CA)

(73) Assignee: Valeda Company, LLC, Oakland Park, FL (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/864,837

(22) Filed: Jul. 14, 2022

(65) Prior Publication Data

US 2022/0347024 A1 Nov. 3, 2022

Related U.S. Application Data

(62) Division of application No. 16/600,071, filed on Oct. 11, 2019, now Pat. No. 11,389,349.

(60) Provisional application No. 62/744,379, filed on Oct. 11, 2018.

(51) Int. Cl.
  *B60P 7/08* (2006.01)
  *A61G 3/08* (2006.01)
(52) U.S. Cl.
  CPC ................... *A61G 3/0808* (2013.01)
(58) Field of Classification Search
  CPC ............. A61G 3/0808; A61G 2203/32; A61G 2203/70; A61G 3/006; A61G 5/1048; A61G 5/1067; A61G 5/121; A61G 5/122; B60N 2/42745; B60N 2/245; B60N 2/4221; B60N 2/888; B60N 2/42781; B60P 7/16; B60R 2021/2074
  USPC .................................................. 410/7, 8, 23
  See application file for complete search history.

(56) References Cited

U.S. PATENT DOCUMENTS

| | | |
|---|---|---|
| 4,995,775 A | 2/1991 | Gresham |
| 7,717,655 B2 | 5/2010 | Cardona |
| 8,100,472 B2 | 1/2012 | Humer et al. |
| 8,205,941 B2 | 6/2012 | McFalls et al. |
| 11,389,349 B2 | 7/2022 | Girardin et al. |
| 2006/0159542 A1 | 7/2006 | Ditch |
| 2008/0073886 A1 | 3/2008 | Palm |

(Continued)

FOREIGN PATENT DOCUMENTS

| | | |
|---|---|---|
| CH | 682048 A5 | 7/1993 |
| ES | 2403161 A2 | 5/2013 |
| WO | 2014137279 A1 | 9/2014 |

OTHER PUBLICATIONS

AMF-Bruns Products Catalog, Publication No. MA200005, Jul. 2019, see especially pp. 2 and 32-33.

(Continued)

*Primary Examiner* — Stephen T Gordon
(74) *Attorney, Agent, or Firm* — Daniel Tallitsch

(57) ABSTRACT

A backrest device that normally supports an occupant and moves forward with the occupant during a forward impact/crash event. The device is equipped with a spring activated biased ratcheting mechanism that provides only forward movement, thus reducing the amount of dangerous rear excursion during the rebound phase, as measured by the occupant's head and torso.

13 Claims, 4 Drawing Sheets

(56) References Cited

U.S. PATENT DOCUMENTS

2010/0086375 A1    4/2010   Tremblay et al.
2011/0204688 A1    8/2011   Undevik
2013/0328340 A1   12/2013  Bruns
2016/0000619 A1*  1/2016   Andersson ........... A61G 3/0808
2020/0323713 A1* 10/2020  Girardin ............... B60P 7/0807

OTHER PUBLICATIONS https://www.schnierle.de/belt-pillar-with-headrest-en.html#belt-pillar-with-headrest.

International Searching Authority (European Patent Office), Communication dated Jan. 3, 2020 in PCT/US2019/055903.

International Searching Authority (European Patent Office), International Search Report and Written Opinion, dated Feb. 20, 2020.

* cited by examiner

REAR EXCURSION BACKREST FOR WHEELCHAIR ACCESSIBLE VEHICLES

CROSS-REFERENCE TO OTHER APPLICATIONS

This application is a divisional of U.S. patent application Ser. No. 16/600,071, filed on Oct. 11, 2019, which claims priority to U.S. Provisional Patent Application No. 62/744,379, filed on Oct. 11, 2018, both of which are incorporated herein by reference.

BACKGROUND

Technical Field

The embodiments described and claimed herein relate generally to a head and/or back rest for use in a wheelchair accessible vehicle in combination with conventional tie downs, such as restraint retractors (usually a pair in the front and a pair in the rear) that are secured to the front and rear of a wheeled mobility device (e.g., a wheelchair).

Background Art

There are 2.2 million wheeled mobility device users in America today. Many users remain in their conventional wheeled mobility device while boarding and riding private or mass transportation vehicles. Systems have been developed to secure wheelchair-bound occupants during impacts, including frontal impacts. These systems are typically comprised of occupant restraints that include at least one shoulder belt along with a lap belt. They also include some form of wheeled mobility device securement that could comprise multiple belts, bumpers, barriers, latches and/or automated grippers. In the most common and simple system, two restraint retractors will be provided to secure the rear of the wheeled mobility device, and two restraint retractors will be provided to secure the front of the wheeled mobility device. Though these devices have proven successful in meeting forward excursions during crash tests, many results have indicated that rebound excursions are another serious hazard for the occupant. During the forward impact, the occupant is restrained by lap and shoulder belts typically constructed from polymers that exhibit a high degree of elasticity. The wheeled mobility device tie downs exhibit similar elastic characteristics. This elasticity is beneficial during the forward excursion because it reduces deceleration of the occupant, and thus reduces the chance and severity of injury to the occupant. At the same time, the wheeled mobility device is moving forward and its movement limited by the use of tiedowns or similar system. The problem occurs during the rebound phase of the event because the energy stored in the occupant restraints and wheeled mobility device tie downs during the forward excursion is returned to the system. As the wheelchair is moving away from the occupant, in this rebound phase, by the time the wheelchair stops, there is a large gap between the occupant and wheelchair backrest, thus by the time the occupant hits the wheelchair backrest, it has stored a lot of energy and its impact is often severe and violent.

Head and back rests are currently known in the prior art. However, those prior art head and back rests are fixed. In that respect, during a forward crash event the occupant and wheeled mobility device will often shift a distance away from the fixed head and back rest while the forward movement loads energy into the restraint devices (i.e., the rear restraints will stretch and load energy, as will the occupant restraints). The occupant will then typically see a violent force reversal as the rear restraints release their stretch and energy on the wheeled mobility device, causing the wheeled mobility device (and its passenger) to be slammed rearward into the head and backrest. As a result, occupants are at risk of striking vehicle structures during rebound which often results in injury and fatality. No known head and back rests on the market today utilize rear excursion and energy management during the rebound phase of forward impact or during a rear impact event.

SUMMARY OF THE PRESENT EMBODIMENTS

Clearly, the prior art devices have limitations which the present embodiments overcome and make for more effective installation and use. The embodiments described in this document is a novel and innovative device that solves excessive rearward excursion of the wheelchair and thus occupant while riding in a vehicle involved in a crash that produces severe forward impact. As the occupant moves forward during the crash event, a robust head and/or back support structure transitions forward simultaneously at or near the same rate, thus the gap between the wheelchair and backrest remains linear and does not significantly increase, unlike traditional systems on the market. The robust head and/or back support structure are equipped with a pivot and biased ratcheting lock mechanism that allows forward movement but prevents rearward movement. The system may contain a friction disc, dampener or deformable member that will resist minor forward impact events without allowing any head and backrest movement. During a significant forward impact event the friction device, dampener or deformable member will allow progressive forward movement dependent of severity. The amount of forward displacement will be mapped to closely match typical forward excursions experienced in tests. Once the occupant begins the rebound trajectory, they make contact with the wheelchair backrest and this then makes contact with the back support at the same time as the occupants head contact the back support, resulting in very little relative velocity and very low resulting impact. The ratcheting lock mechanism rapidly engages and prevents rearward pivoting, thus arresting the occupant's rearward excursion. The ratcheting lock mechanism can be manually released when required for stowage or occupant movement.

In some embodiments, the head and/or back support, once positioned adjacent to the head and/or seatback, may be secured to the wheelchair itself (e.g., the wheelchair frame, and not the wheelchair seat back) using some form of tie-down, which may comprise a retractor, belt and hook, or any other manual or automatic belt, strap, cable, chain, or the like). Tying the head and/or back support to the wheelchair will enhance the ability of the support to follow the wheelchair during a forward excursion and/or will transfer the loads seen by the head and/or back support during the occupant's rear excursion to the front wheelchair tie-downs (whereby the loads pass through the wheelchair frame). The strength of the head and/or back support can also be enhanced by additionally or alternatively tying the head and/or back support to some other structure in the vehicle, such as a connection point on the floor, wall, or ceiling of the vehicle, including but not limited to the front wheelchair tie-downs.

The present embodiments also provide benefits during a rear impact. During the rear impact, the backrest will stop the excursion in the rear direction, and during the rebound (when the passenger and wheeled mobility device will lunge forward), the backrest will follow the wheeled mobility device, minimizing again the re-rebound movement. In that respect, even in a rear impact, the backrest will minimize or stop rebound oscillations.

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings.

Figure 1:
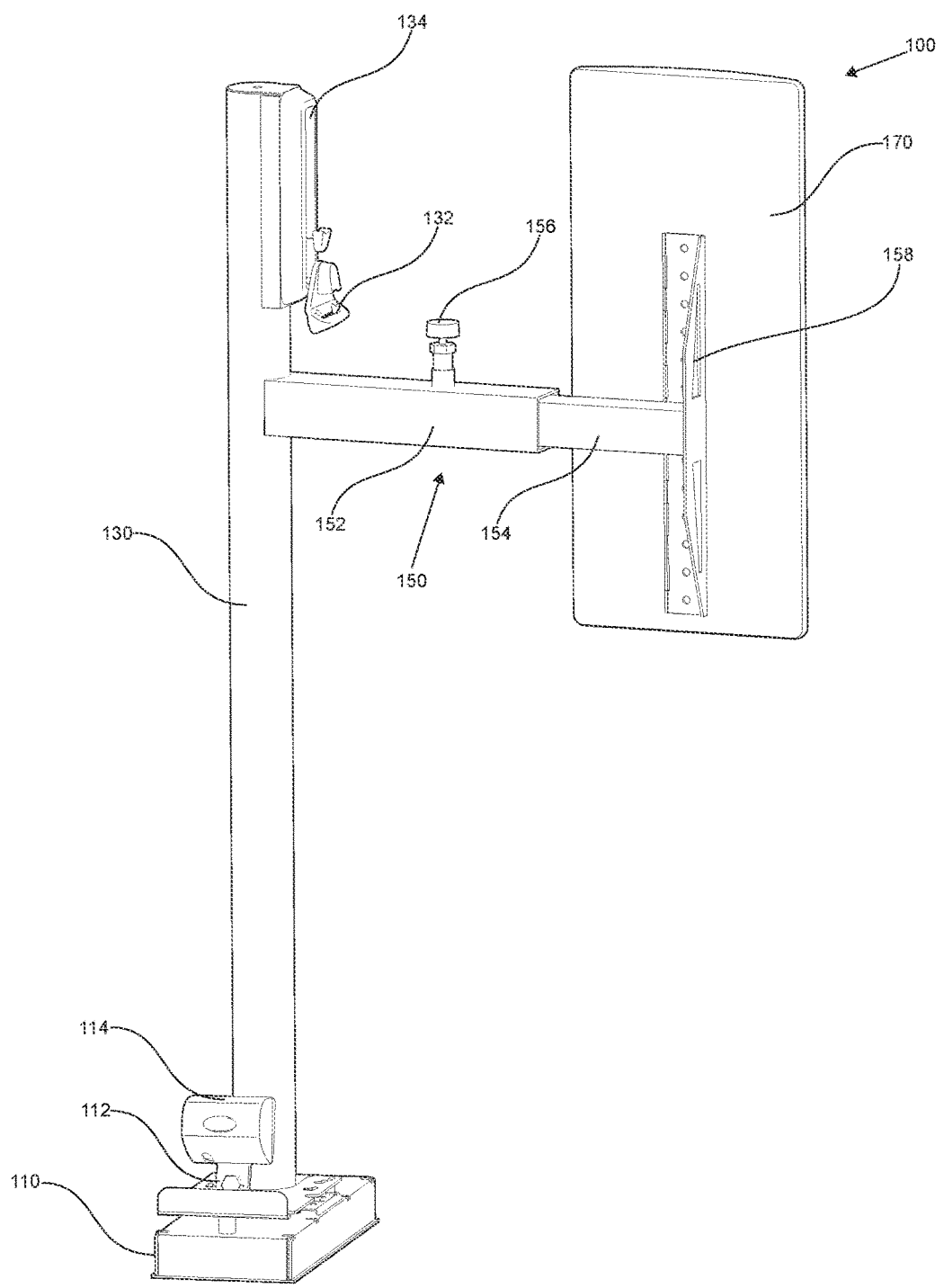
FIG. 1 is a perspective view of a first embodiment of a head and back rest for a wheelchair accessible vehicle.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE PRESENT EMBODIMENTS

With reference to FIGS. 1-4, a first embodiment of a backrest 100 is shown for use in combination with a wheeled mobility device securement system in a wheelchair accessible vehicle. The backrest includes a floor-mounted base 110 that is attached to the vehicle floor at or near the rear of a wheelchair securement area using, for example, conventional fasteners. The base 110, or other structure of the backrest 100, may include a bracket 112 to hold a shoulder belt retractor 114. The floor-mounted base 110 supports and provides a pivot point for a vertical stanchion or pivot member 130. Although the pivot is shown aligned with a vertical axis, it is contemplated that the pivot may be aligned with either a vertical, horizontal, or other axis. Moreover, while the base 110 is shown to be floor-mounted, it is contemplated that the base may be a wall- or ceiling mounted structure.

As mentioned, the pivot member 130, as shown, is configured to pivot about a vertical axis. It includes a shoulder belt guide 132 with a track structure 134 that allows the shoulder belt to be vertically adjustable to multiple fixed positions at different heights. Although not shown, a shoulder belt would extend from the retractor 114 and through the guide 132, and may be pulled around the shoulder of an occupant to secure the passenger. The pivot member 130 also supports a telescoping arm 150 comprising a first member 152 and a second member 154. The length of the telescoping arm can be adjusted by sliding the second member 154 relative to the first member 152, and the relative positions of the first and second members 152, 154 can be fixed using lock member 156. The telescoping arm 150 is fixed at its base to the pivot member 130, whereby the arm 150 will rotate with the pivot member, about a vertical axis. At its free end, the telescoping arm 150 includes a bracket 158 for attachment to a contact member 170 that may comprise a padded or compressible material. The bracket 158 may include multiple apertures or other structures that allow the contact member to be vertically adjustable to multiple fixed positions at different heights.

Figure 2:
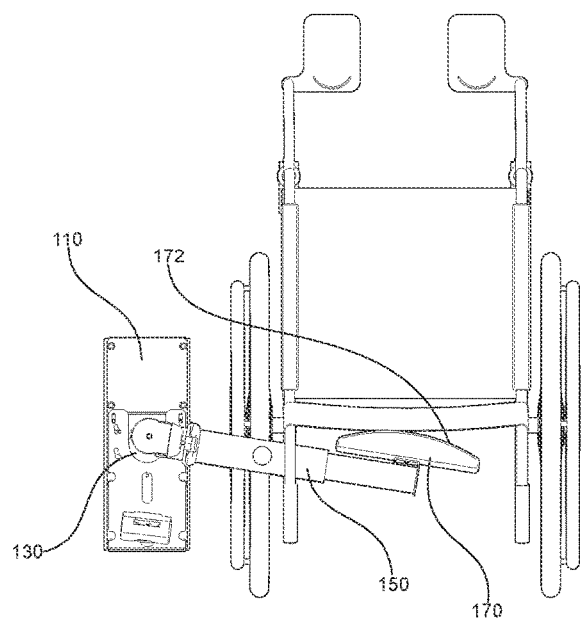
FIG. 2 is a top view of the head and back rest of the first embodiment in a first position, prior to a frontal accident.
Figure 3:
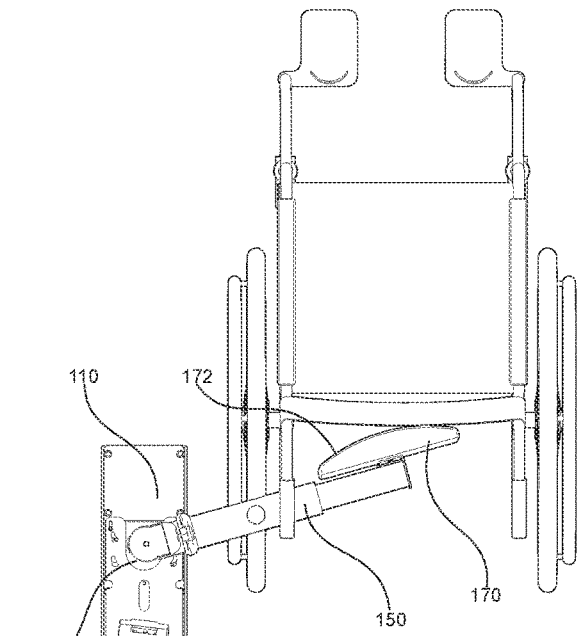
FIG. 3 is a top view of the head and back rest of the first embodiment in a second position, after a frontal accident and just prior to a rebound.
Figure 4:
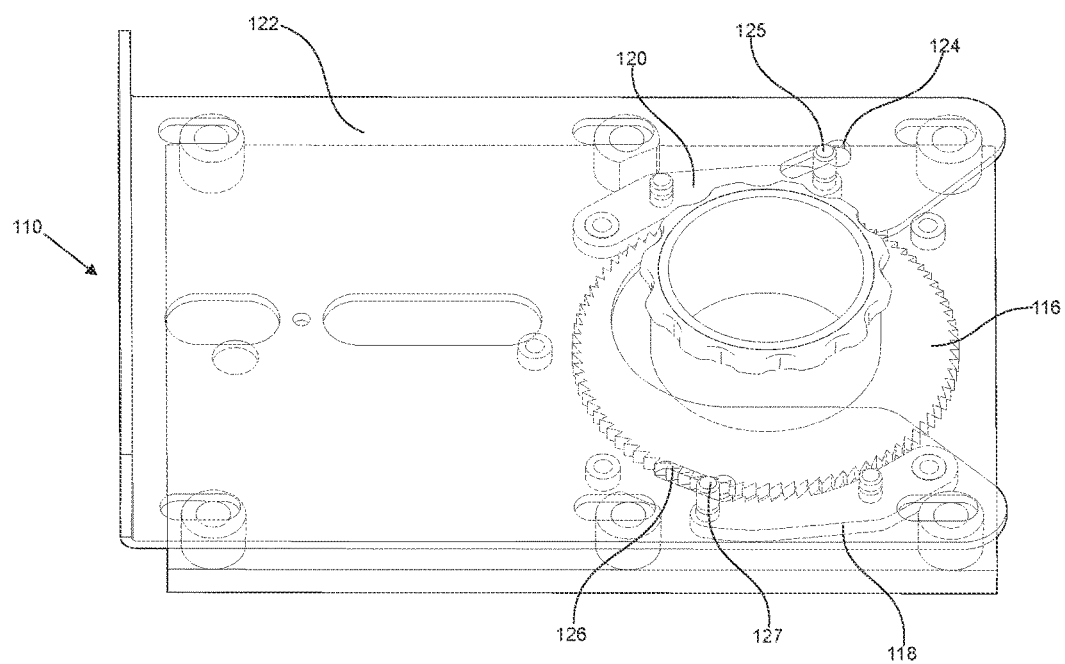
FIG. 4 is a perspective view of a partially transparent base of the head and back rest of the first embodiment, showing the ratcheting and release mechanisms.

The contact member 170 may be short and configured to support solely a back of the occupant, or may be long (as shown) and configured to support both a back and head of the occupant. For the avoidance of doubt, and for purposes of simplicity, the term "backrest" is used herein to refer to any support provided for a back and/or head of an occupant. As best shown in FIGS. 2-3, the contact member 170 includes a curved front surface 172, whereby the contact member 170 will always make "normal" (i.e., perpendicular) contact with the wheeled mobility device and/or occupant.

By virtue of the pivotable connection between the pivot member 130 and the base 110, the contact member 170 will be able to follow the wheeled mobility device (and occupant) during a forward crash event, as is best shown in FIGS. 2-3. More particularly, in one embodiment, the forward momentum of the arm 150 and contact member 170 will cause the pivot member to rotate from the first position shown in FIG. 2 to the second position shown in FIG. 3, in a forward impact event. Note that other embodiments are contemplated that do not use a pivoting contact member 170, but rather rely upon, for example, linear movement of the contact member. For example, the backrest could by constructed with a scissors mechanism, linear slides, and/or struts whereby the contact member 170 will follow the back of the wheeled mobility device in a linear direction.

Moreover, while the preferred embodiment uses the momentum of the backrest 100 as the motive force for moving the contact member 170 in close proximity to the back of the wheeled mobility device, other sources of motive force are contemplated. For example, in other embodiments, springs or other similar devices may be used to bias the contact member 170 against the back of the wheeled mobility device, whereby the contact member 170 will follow the back of the wheeled mobility device during a forward impact. In yet other embodiments, pyrotechnic devices could be used to cause the contact member 170 to follow the back of the wheeled mobility device in the event of an accident, whereby the pyrotechnic device is activated in response to sensors that detect a forward impact. The pyrotechnic device could move the entire contact member 170 forward, or could simply expand the contact member 170, using an internal bladder or the like, whereby the front surface of the contact member 170 would follow the wheeled mobility device forward. A similar bladder type expansion device could be also be used in the absence of pyrotechnics. For example, the expansion device could expand upon the release of gas or other fluids stored in a canister. Alternatively, depending upon the necessary response time, compressors or other similar compression devices could be used to expand the bladder during an accident. In yet other embodiments, the backrest 100 could employ gas, pneumatic, or electric struts that either bias the contact member 170 against the back of the wheeled mobility device, or respond quickly to push the contact member 170 forward in the event that a sensor detects a forward impact, whereby the backrest. In yet other embodiments, the contact member 170 could be directly connected to the wheeled mobility device using belts, buckles, or straps, whereby the wheeled mobility device will pull the contact member 170 when it moves forward during a forward impact. A similar result could be achieved by attaching the contact member 170 to the hooks of the rear wheeled mobility device tie-downs (in which case the contact member 170 could be said to be indirectly attached to the wheeled mobility device).

The base 110 contains a spring-loaded ratchet 116 and pawl 118, 120 assembly that allows the pivot member 130 to rotate, in this case in a counterclockwise direction, to automatically positive-lock to prevent clockwise rotation. In this case, the ratchet 116 is fixed to the bottom end of the pivot member 130, and the pawls 118, 120 are pivotally attached to the base 110. The springs (not shown) urge the pawls 118, 120 into contact with the ratchet 116. The base 110 includes a release member 122, in this case a plate, that include slots 124, 126 that engage with pins 125, 127 to pull the pawls 118, 120 out of contact with the ratchet 116, whereby the vehicle operator can pivot the arm 150 and contact member 170 in a clockwise direction, away from the wheeled mobility device, so that the occupant can exit the vehicle through the rear doors.

In alternative embodiments, the stanchion 130 may be fixed to the floor of the vehicle, and the ratchet and pawl mechanism may be located at the connection point between the stanchion 130 and the arm 150, whereby the arm 150 is not fixed to but rather rotates relative to and about the stanchion 130. In yet other embodiments, the stanchion can be omitted entirely, and the arm 150 can be fixed directly to the base 110, which in turn could be mounted to any structure in the vehicle—e.g., floor, wall, or ceiling.

Although the invention has been described in terms of a wheeled mobility device that is forward facing with respect to the vehicle direction of travel, it is contemplated that the backrest could be useful in side- and rear-facing systems. In that respect, the term "forward impact" should be taken to mean any impact in a forward direction with respect to the direction the wheeled mobility device occupant is facing (without respect to the direction the vehicle is facing). Similarly, the term "rear impact" should be taken to mean any impact in a rearward direction with respect to the direction the wheeled mobility device occupant is facing.

As designed, the head and back rest 100 is easily adjustable and facilitates simplified loading and unloading of wheelchair-bound occupants with less time, effort and skill. The probability of error during positioning becomes greatly reduced as the device is allowed to move freely against the occupant and/or wheelchair. The simplified design and reduced part-count also produce cost and weight reductions. Minimized rear excursion provides an added layer of safety for the occupant by preventing impact with the vehicle interior where installations don't allow for typical displacements found in crash events.

Figure 5:
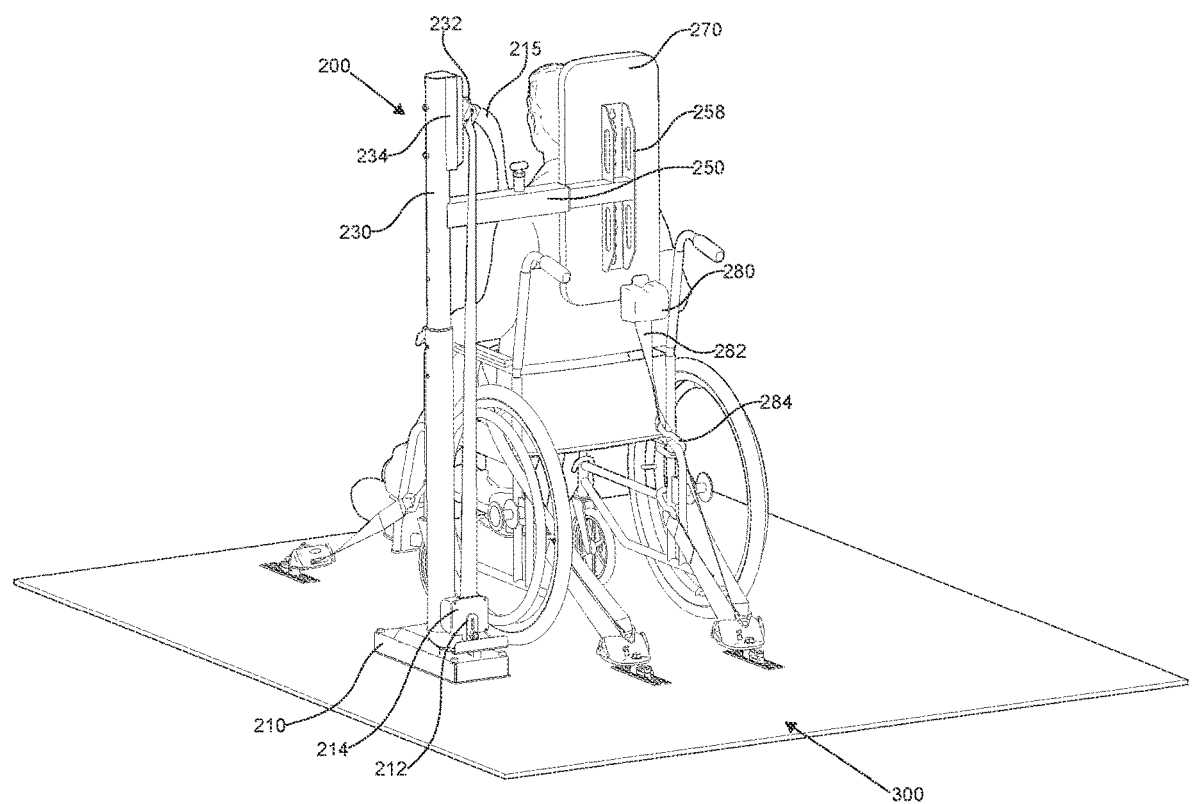
FIG. 5 is a perspective view of a second embodiment of a head and beck rest for a wheelchair accessible vehicle.
Figure 6:
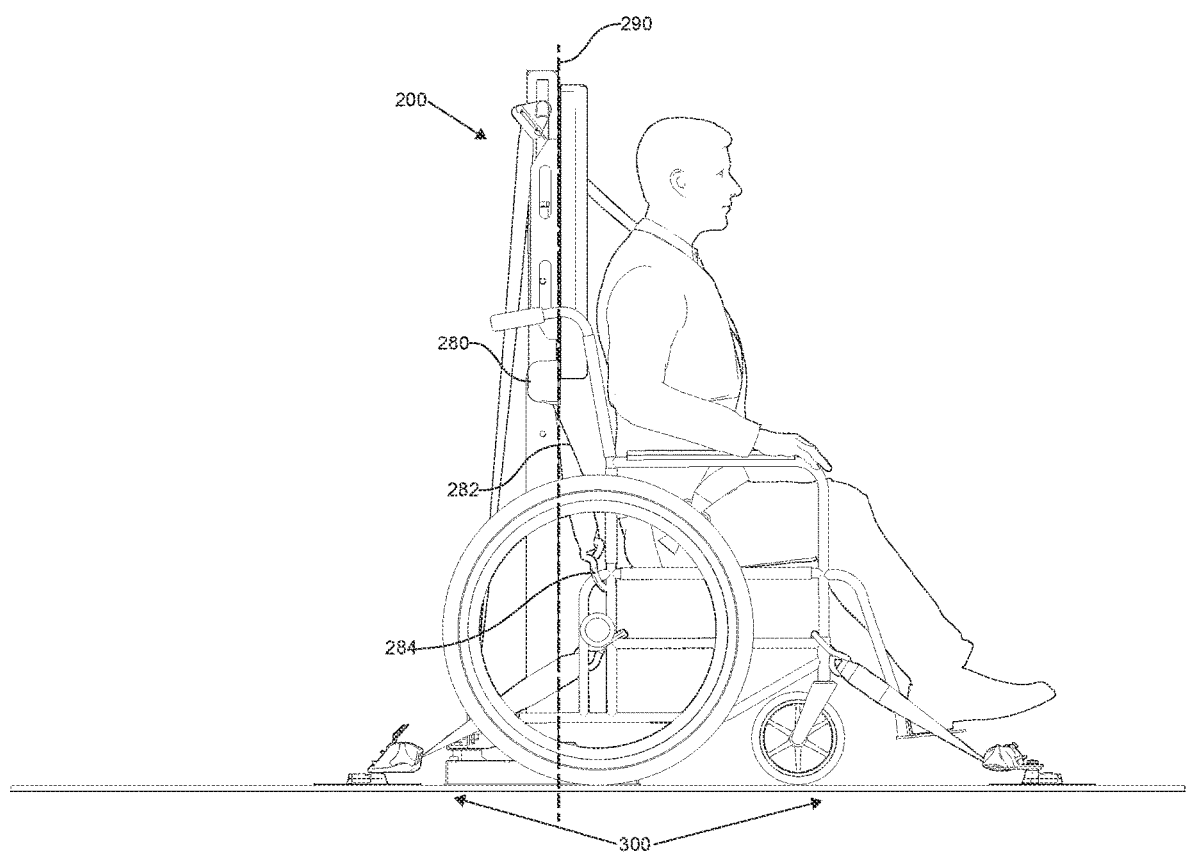
FIG. 6 is a side view of the second embodiment.

Turning now to FIGS. 5-6, a second embodiment of a backrest 200 is shown in combination with a wheeled mobility device securement system 300 in a wheelchair accessible vehicle. The backrest 200 of the second embodiment is largely the same as the backrest 100 of the first embodiment, in that it may also include a floor-mounted base 210, a vertical stanchion or pivot member 230, a bracket 212 that holds a shoulder belt retractor 214, a shoulder belt guide 232 that receives the shoulder belt 215 from the shoulder belt retractor 214 and is height adjustable via track 234, a telescoping (or fixed length) arm 250, and a bracket 258 for attachment to a contact member 270. Notably, the internals of the floor-mounted base 210 may be configured the same as the floor-mounted base 110 of the first embodiment. Notably, in the second embodiment, the pivot member 230 telescopes to make the contact member height-adjustable. In addition, the backrest 200 includes a tie-down 280 that may be used to secure the contact member 270 to the wheelchair, the wheeled mobility device securement system 300, or the vehicle itself. In this case, the tie-down 280 is an automatic locking retractor with a belt 282 and hook 284. While the tie-down 280 is shown secured to the rear-side and bottom right corner of the contact member, it could be secured to any other portion of the backrest 200, such as the arm 250 and/or bracket 258. It is contemplated that the vehicle operator, after positioning the contact member 270 adjacent to the seatback, will secure the hook 284 to a structure forward of or on plane 290 with the connection point between the tie-down and the contact member 270 (i.e., a plane have dimensions in the vertical and lateral directions). As shown, the hook 284 is secured to the frame of the wheelchair, although it could be secured to the hook eyes of the rear retractors, any portion of the front retractors, or any portion of the vehicle. As discussed above, tying the contact member 270 to the wheelchair or other structure of the securement system 300 or vehicle will enhance the ability of the contact member 270 to follow the wheelchair seatback and/or will strengthen the backrest 200 by splitting the load of a rear excursion between the pivot member 230 and the tie-down 280.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A moveable backrest intended for a use in combination with a wheeled mobility device securement system in a wheelchair accessible vehicle, the moveable backrest comprising:
   an arm having a pivot axis at a first end and a contact member at a second end;
   a ratchet and pawl mechanism that permits the arm to rotate about its axis in a first direction, and precludes the arm from being rotated about its pivot axis in an opposite direction.

2. The moveable backrest of claim 1 installed in the wheelchair accessible vehicle and being disposed at the rear of a wheeled mobility device securement area, whereby the ratchet and pawl mechanism permits the arm to rotate in the first direction toward a front of the wheeled mobility device securement area.

3. The moveable backrest of claim 2, wherein the pivot axis is aligned with an axis selected from the group including a vertical axis and a horizontal axis.

4. The moveable backrest of claim 2, wherein the ratchet and pawl mechanism is disposed in a base that is fixed to a structure selected from the group including the wheelchair accessible vehicle, a floor of the wheelchair accessible vehicle, a wall of the wheelchair accessible vehicle, and a ceiling of the wheelchair accessible vehicle.

5. The moveable backrest of claim 4, wherein the ratchet and pawl mechanism includes a ratchet and a pawl, and wherein the base includes a release member for disengaging the pawl from the ratchet to allow for free rotation of the arm.

6. The moveable backrest of claim 2, further comprising a stanchion pivotally fixed at a base to the wheelchair accessible vehicle, wherein the arm is rigidly fixed to and pivots with the stanchion.

7. The moveable backrest of claim 2, further comprising a stanchion rigidly fixed at a base to the wheelchair accessible vehicle, wherein the arm is pivotally attached to the stanchion.

8. The moveable backrest of claim 7, wherein the ratchet and pawl mechanism includes a ratchet and a pawl, and wherein the ratchet is fixed to a bottom end of the stanchion and the pawl is fixed to the base.

9. The moveable backrest of claim 7, wherein the ratchet and pawl mechanism includes a ratchet and a pawl, and wherein the pawl is fixed to a bottom end of the stanchion and the ratchet is fixed to the base.

10. The moveable backrest of claim 2, wherein the arm includes a first member and a second member, wherein the first member telescopes relative to the second member to change a length of the arm.

11. The moveable backrest of claim 10, further including a locking member for locking the position of the second member relative to the first member.

12. The moveable backrest of claim 2, wherein the contact member includes a curved front surface.

13. The moveable backrest of claim 1, wherein the contact member includes a curved front surface.

\* \* \* \* \*